July 3, 1962 — D. F. PRESTON — 3,042,378
PULLEY ASSEMBLY
Filed Sept. 18, 1958
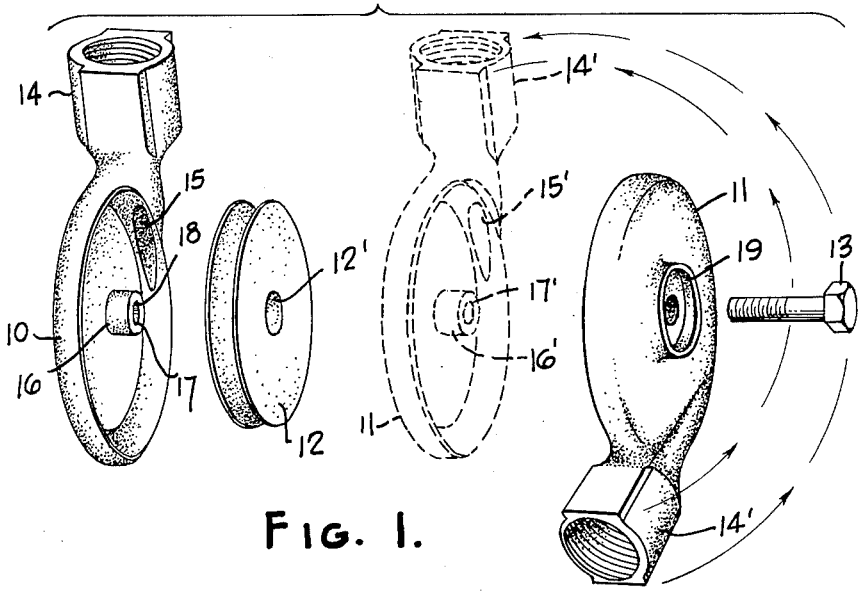
FIG. 1.
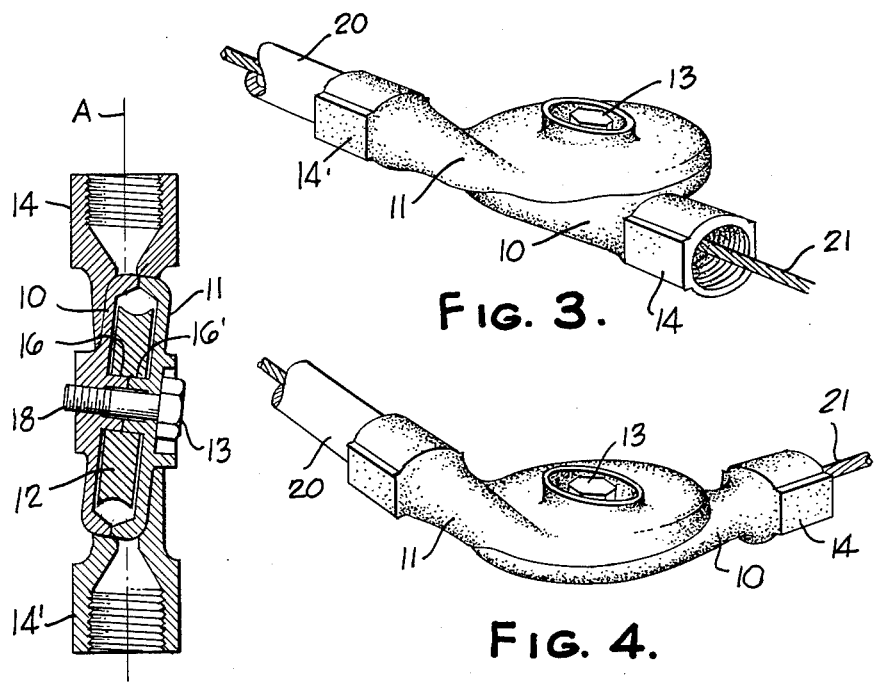
FIG. 2.
FIG. 3.
FIG. 4.
INVENTOR.
DON F. PRESTON
BY Elliott & Pastoriza
ATTORNEYS.

** 3,042,378
PULLEY ASSEMBLY
Don F. Preston, Pacific Palisades, Calif., assignor to General Fire Extinguisher Corporation, a corporation of California
Filed Sept. 18, 1958, Ser. No. 761,866
5 Claims. (Cl. 254—190)

This invention relates generally to pulleys. More particularly, it has to do with an improved pulley assembly for use in stringing cables in which it is desirable that the cable be completely enclosed.

Enclosed pulleys for guiding pull cables and the like around corners or in certain specified directions are well known in the art. Generally, the housing provided about the pulley wheel is necessary in order to meet certain code regulations requiring adequate protection of the cable or line. Oftentimes, the ends of the pulley housing are provided with threaded nipples for direct connection to conduits which enclose the cable or line.

In stringing cables through conduits and enclosed pulleys of the above type, it has heretofore been necessary to disassemble the entire pulley housing in order to position the cable about the pulley wheel. In some instances, improved versions enable stringing of the pulley cable about the pulley wheel by only removing a cover plate of the housing, but there is still a requirement that at least a portion of the housing be disassembled. Such an operation is objectionable not only because it is time consuming but principally because of the resulting increased cost in labor to install a cable or line system.

In cases where it is required that the cable turn around a corner, it has heretofore usually been necessary to provide a pulley housing in which the entrance and exit passages tangential to the pulley wheel form the necessary angle with respect to each other. Thus, several different types of fixed angle pulley housing assemblies were required for any given installation and the worker was required to select a particular angled housing to suit the particular connection to be made. In an improved version of the pulley housing, it has been proposed to provide a pulley assembly in which the entrance and exit cable passages to the pulley wheel may be angularly varied. The pulley assembly itself for enabling such an adjustment in this proposed version, however, is relatively expensive to manufacture and still suffers the disadvantage of requiring partial disassembly in order to string the cable over the pulley wheel.

Bearing the foregoing in mind, it is a primary object of the present invention to provide a greatly improved pulley assembly in which a pulley wheel is completely enclosed within a pulley housing and yet in which no disassembly whatsoever is required for stringing the cable or line about the pulley wheel.

Another very important object of this invention is to provide a pulley assembly of the above type which is extremely economical to manufacture requiring for the pulley housing only a single die or mold for forming the components thereof.

Still another object of the invention is to provide a pulley assembly in which the entrance and exit passages for the cable or line to be passed over the pulley wheel may be varied in angular respect to each other through an arc of 210° whereby the pulley assembly is readily adaptable to any particular installation.

Another important object is to provide a pulley assembly which may be interposed between two conduits which are already secured in position and form an angle with respect to each other, without requiring any disassembly or removal of the conduits themselves so that the pulley assembly constitutes a pipe or conduit coupling.

Briefly, these and many other objects and advantages of the present invention are attained by providing a pair of identical pulley housing halves of general cup shaped configuration. Each housing half includes a tangential passage in a portion of its peripheral wall preferably continuing into a threaded nipple structure for securement to a cable conduit. Inasmuch as the two halves are identical in dimensions and construction, only a single die or casting mold is necessary to form the halves and after two identical pieces have been produced one is simply reversed spatially with respect to the other so that they can be placed in face to face engagement to surround a pulley wheel.

The pulley wheel itself comprises a conventional disc shaped pulley element having a central bore for receiving a suitable shaft upon which it can rotate. In the instant invention, the journaling shaft for the pulley wheel is provided by a central boss on each pulley housing half which extends outwardly of the cup shaped configuration to terminate in the plane of the upper peripheral edge of the housing half. Thus, when the two housing halves are positioned to enclose the pulley wheel, the central boss of each half will be respectively received in the opposite end openings of the central bore of the pulley to meet in the middle and journal the pulley wheel. Each boss includes a center hole which becomes aligned with the other when the pulley housing halves are positioned in face to face engagement, and a simple fastening means such as a bolt or screw may be passed therethrough to secure the pulley housing halves in position.

By effecting relative circumferential rotation between the pulley housing halves the angle between the tangential passages in each pulley housing half may be varied and when a desired angle is provided, the fastening means may be tightened. Since the angle between the tangential passages can be made of any value to facilitate stringing of the cable through the pulley, the passages are initially aligned with each other so that the cable may be passed straight through and then the halves may be adjusted circumferentially with respect to each other to form the desired entrance and exit angle for the cable itself depending upon the installation requirements. Thus, it will be evident that no disassembly at all of the pulley will be necessary to string the cable.

A better understanding of the invention will be had by referring to a preferred embodiment thereof as shown in the accompanying drawings, in which:

FIGURE 1 is an exploded perspective view of the various components making up the pulley assembly;

FIGURE 2 is a cross section of the pulley housing halves and pulley wheel when in assembled position;

FIGURE 3 is a perspective view of the completely assembled pulley system wherein the parts thereof are in a first position to facilitate stringing of a cable therethrough; and, FIGURE 4 is a view similar to FIGURE 3 illustrating the appearance of the pulley assembly after an angular adjustment has been made.

Referring first to the exploded view of FIGURE 1, the basic components of the pulley assembly comprise a pair of pulley housing halves 10 and 11, a pulley wheel 12, and a fastening means in the form of a bolt 13. When the pulley housing half 11 is spatially reoriented by rotating it through 180° about an axis normal to the plane of the drawing to the dotted line position illustrated in FIGURE 1, it will be noted that it is identical in dimensions to the pulley housing half 10. As a consequence, the same die or mold may be employed for making each pulley housing half with a consequent savings in manufacturing expenses.

As shown in FIGURE 1, the pulley housing half 10 is of generally cup shaped configuration and includes an integrally formed threaded nipple 14 extending tangentially from the periphery of the cup shape to define a tangential passage 15 opening out on the interior wall surface of the housing half. The central interior portion of the pulley housing half includes an integrally formed outwardly extending cylindrical boss 16 terminating in the plane of the upper peripheral edge of the cup shaped housing. Preferably, this boss 16 includes a center hole 17 passing axially therethrough.

The corresponding portions of the pulley housing half 11 are identified in FIGURE 1 in the dotted line representation by the corresponding primed numerals 14', 15', 16', and 17'.

After the pulley housing halves have been cast as described, one of the pulley housing halves such as the housing half 10 has the center hole in its corresponding boss 16 threaded internally as indicated at 18 and best shown in the cross section in FIGURE 2. The other pulley housing half in turn may be provided with a small annular recessed step 19 on its exterior side for seating the underside of the head of the bolt 13.

After the above described operations have been completed, it is then a simple matter to assemble the pulley housing halves by positioning the pulley housing half 11 in opposing relationship as shown by the solid line representation in FIGURE 1 and placing it in face to face engagement with the half 10 such that the bosses 16 and 16' enter into the opposite end opening of the central bore 12' of the pulley 12 to journal the same all as is shown best in the cross section view of FIGURE 2. The bolt 13 may then be threaded in the internal thread 18 and the assembly retained in position.

It will be noted in the cross sectional view of FIGURE 2 that the plane of the pulley housing halves and the pulley wheel 12 forms a slight angle with respect to a vertical line A passing through the nipples 14 and 14'. This small angle is desirable so that the entrance and exit passages 15 and 15' can be wholly formed in the respective peripheral annular walls of the cup shaped housings to accommodate the diameter of a cable or other line to be passed about the pulley wheel and still prevent such opening from being exposed when the pulley housing halves are circumferentially rotated with respect to each other to different positions.

FIGURE 3 illustrates the two pulley housing halves in assembled relationship wherein the nipples 14 and 14' are in axial alignment so that the nipple 14', for example, may be readily threaded to a conduit 20. In operation and prior to threading of the nipple 14' to the conduit 20, the cable indicated at 21 is first passed through the nipple 14' and out of the nipple 14 which operation is extremely simple inasmuch as the nipples are aligned as shown. Note that this stringing of the cable through the pulley housing assembly can be accomplished without any disassembly of any of the parts of the pulley housing. After the nipple 14' has been threaded to the conduit 20, the fastening means in the form of the bolt 13 may be loosened slightly and the pulley housing half 10 rotated circumferentially with respect to the pulley housing half 11. For example, in FIGURE 4 the pulley housing half 10 has been shown as rotated through an angle of ninety degrees, it being assumed that it is desired to pass the cable around a corner. The cable 21 extends in the proper direction to be received within the next conduit or pipe which may then be threaded into the nipple 14. The bolt 13 may then be tightened to retain the housing halves in tight face to face relationship.

It will be evident from the split pulley housing construction that in the event a pipe or conduit is already installed in position it is possible to first disassemble the pulley housing halves and thread one half to one pipe and thread the other half to the other pipe and then place the cup shaped portions of the housing halves together in face to face engagement to enclose the pulley wheel after threading the cable therearound. There is thus provided a pipe coupling for the two conduits which could not be otherwise threaded to the conduits except for the feature of the split housing construction.

From the foregoing description, it will be evident that the present invention provides an extremely simple pulley assembly in which only four major components are necessary, specifically: the two pulley housing halves 10 and 11, the pulley wheel 12, and the bolt 13. As mentioned heretofore, the two pulley housing halves are identical in dimensions with the exception of the small threading operation performed on one of the pulley housing halves after it has been cast, and the annular recessed seating surface 19 on the other housing half to seat the head of the bolt 13. Therefore, the entire pulley assembly may be extremely economically manufactured. Moreover, the assembly of the various pulley housing halves with the pulley wheel is extremely simple and can readily be accomplished by unskilled personnel.

It will also be appreciated from the foregoing that angles between the tangential passages 15 and 15' of the respective pulley housing halves other than 90° may be effected by relative circumferential rotation of the housing halves. This angle may vary from 180° to 390° or over an arc of 210°, the angular relationship of the plane of the pulley wheel and housing halves with respect to the nipple axis A as shown in FIGURE 2 permitting a 30° overlap of the nipples beyond 360°.

Minor modifications of the pulley assembly that fall within the scope and spirit of the present invention will occur to those skilled in the art. The device is, therefore, not to be thought of as limited to the exact embodiment set forth for illustrative purposes.

What is claimed is:

1. A pulley assembly comprising: a pair of mating and complementary housing halves of general cup shaped configuration designed to have their open ends in face-to-face engagement and lie in a common plane, each having a tangential passage in a portion of its peripheral wall; a pulley wheel; and fastening means for securing said pulley housing halves in said face-to-face engagement to enclose said pulley wheel, said halves being circumferentially adjustable to vary the angle between their respective passages, and said passages being canted at an angle with respect to said common plane, such that said passages lie on a common axis when positioned 180 degrees apart thereby enabling threading of said pulley assembly without uncoupling said halves.

2. The subject matter of claim 1, in which each of said pulley housing halves includes a threaded nipple defining a continuation of said tangential passage, for threaded connection to a conduit, the angle between the passages in said housing halves being adjustable by effecting relative circumferential rotation of said housing halves with respect to each other.

3. A pulley assembly including: a pair of mating and complementary housing halves of substantially identical construction, each of said halves comprising a cup shaped housing having a threaded nipple formed on a peripheral portion thereof and defining a passage opening tangentially at an inside wall portion of the cup shaped housing, the center portion of said housing being raised to define a cylindrical boss extending to the plane of the upper peripheral edge of said cup shaped housing, said boss having a hole therethrough, and said halves being designed to have their open ends in face-to-face engagement and lie in a common plane; a pulley wheel having a central bore for receiving said boss in one end; and fastening means for passing through the center hole in each cup shaped housing when the same are placed in face-to-face engagement to enclose said pulley wheel; and said nipple passages being canted at an angle with respect to said common plane such that said passages lie on a common axis when positioned 180 degrees apart, thereby enabling threading of said pulley assembly without uncoupling said halves.

4. The subject matter of claim 3, in which the center hole in the boss of said first cup shaped housing is internally threaded, said fastening means comprising a bolt having a bolt head at one end engaging the exterior peripheral edge of the center hole of said second cup shaped housing and having its threaded end threadedly received in said internally threaded center hole of said first cup shaped housing.

5. The subject matter of claim 4, in which the peripheral area engaged by the under side of said bolt head is recessed.

References Cited in the file of this patent

UNITED STATES PATENTS

| | | |
|---|---|---|
| 1,232,473 | Anderson | July 10, 1917 |
| 1,372,900 | Olinger | Mar. 29, 1921 |
| 1,627,076 | Caracristi | May 3, 1927 |
| 1,672,075 | Morris | June 5, 1928 |
| 2,611,581 | Hannant | Sept. 23, 1952 |